(12) United States Patent
Tang et al.

(10) Patent No.: US 11,983,942 B2
(45) Date of Patent: May 14, 2024

(54) EDGE DEVICE AND METHOD FOR DETECTING SPECIFIC OBJECT BASED ON SPECIFIC MODEL

(71) Applicant: HIMAX TECHNOLOGIES LIMITED, Tainan (TW)

(72) Inventors: Ti-Wen Tang, Tainan (TW); Kuan-Ting Lai, Tainan (TW); Chin-Kuei Hsu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 313 days.

(21) Appl. No.: 17/357,901

(22) Filed: Jun. 24, 2021

(65) Prior Publication Data
US 2022/0414363 A1   Dec. 29, 2022

(51) Int. Cl.
| | |
|---|---|
| G06V 20/00 | (2022.01) |
| G06F 3/04842 | (2022.01) |
| G06F 3/04883 | (2022.01) |
| G06N 3/08 | (2023.01) |
| G06V 10/22 | (2022.01) |
| G06V 10/82 | (2022.01) |
| G06V 20/64 | (2022.01) |
| H04L 67/10 | (2022.01) |

(52) U.S. Cl.
CPC .......... *G06V 20/64* (2022.01); *G06F 3/04842* (2013.01); *G06F 3/04883* (2013.01); *G06N 3/08* (2013.01); *G06V 10/235* (2022.01); *G06V 10/82* (2022.01); *H04L 67/10* (2013.01)

(58) Field of Classification Search
CPC ...... G06V 20/64; G06V 10/235; G06V 10/82; G06V 10/95; G06V 20/20; G06F 3/04842; G06F 3/04883; G06F 3/0482; G06F 3/0488; G06N 3/08; H04L 67/10; H04W 4/00
See application file for complete search history.

(56) References Cited

U.S. PATENT DOCUMENTS

| | | | |
|---|---|---|---|
| 2017/0140236 A1* | 5/2017 | Price | G06N 3/045 |
| 2020/0241482 A1* | 7/2020 | Sinha | G06N 3/045 |

OTHER PUBLICATIONS

Luo et al, An Edge-Cloud Framework Equipped with Deep Learning Model for Recyclable Garbage Detection, Eighth International Conference on Advanced Cloud and Big Data (CBD), pp. 248-252 (Year: 2020).*

(Continued)

*Primary Examiner* — Ping Y Hsieh
*Assistant Examiner* — Xiao Liu
(74) *Attorney, Agent, or Firm* — Winston Hsu

(57) ABSTRACT

A method for detecting a specific object based on a specific model includes: capturing a set of images, wherein objects in each image include a desired object; transmitting the set of images to a cloud server; in response to found objects being obtained from the set of images based on at least one object detection algorithm in the cloud server, displaying the found objects for a user to confirm which object is desired; in response to the desired object being confirmed from the found objects that are displayed, loading the specific model of the desired object from the cloud server, wherein the specific model of the desired object is trained on the cloud server based on at least the set of images and related CNN algorithm; and performing the specific model to detect the specific object on a captured image.

11 Claims, 3 Drawing Sheets

(56) References Cited

OTHER PUBLICATIONS

Ran et al, DeepDecision: A Mobile Deep Learning Framework for Edge Video Analytics, IEEE Infocom, pp. 1421-1429 (Year: 2018).*
Yahya Nikouei et al Smart Surveillance as an edge network service: from Harr-Cascade, SVM to a lightweight CNN, arXiv1805.00331v2 Oct. 1 (Year: 2018).*
Qi et al, A DNN-Based Object Detection System on Mobile Cloud Computing, 17th International Symposium on Communications and Information Technologies (ISCIT) (Year: 2017).*

* cited by examiner

EDGE DEVICE AND METHOD FOR DETECTING SPECIFIC OBJECT BASED ON SPECIFIC MODEL

BACKGROUND OF THE INVENTION

1. Field of the Invention

The present invention is related to an edge device performing a specific model, and more particularly, to obtain the specific model by utilizing images captured by the edge device and a confirmation mechanism.

2. Description of the Prior Art

With the development of artificial intelligence in recent years, for edge devices (e.g. smartphones), users usually connect the edge devices to a cloud server through a network (e.g. Internet), wherein the computational performance of the cloud server is better than that of the edge devices. For example, due to issues such as data privacy, computational latency, and hardware cost, after capturing a set of images by a camera of an edge device, a user of the edge device uploads the set of images to the cloud server to directly train a corresponding model on the cloud server. After training, the trained model is deployed on the edge device. It should be noted that a specific object that user desires should be in each image, and the trained model can detect/class the specific object.

However, in general, the set of images captured by the camera of the edge device are usually incomplete and therefore have limitations. There are two issues. One is the undesired classification/detection and another is the low accuracy rate. In reality, a trained model may detect not a desired object of a user but an undesired object. The user always confirms whether the model is fit or not by testing the model on the edge device. It needs to retrain the model multiple times until it fits the desired object. As a result, it is quite uncertain and inefficient. For example, the set of images is about many kinds of fruits. However, the trained model is for detecting the orange instead of the lemon that is desired object of the user. In addition, the user only collects a small number of images such as 20 images from his/her smartphone. A model trained with incomplete data will usually be over-fitting, resulting in low accuracy rate. As a result, for the trained model operating on the edge device, there is a need to improve its accuracy rate and make it fits the desired classification/detection.

SUMMARY OF THE INVENTION

It is therefore one of the objectives of the present invention to provide a method for detecting a specific object based on a specific model and associated edge device, to address above-mentioned issues.

According to an embodiment of the present invention, an edge device is provided. The edge device is arranged to detect a specific object based on a specific model, and includes a camera, a display device, a processor, and a communication interface. The processor is arranged to perform the specific model to detect the specific object on an image captured by the camera. The communication interface is arranged to transmit data between a cloud server and the edge device. In addition, the edge device obtains the specific model by performing steps of: (a) capturing a set of images by the camera, where objects in each image include a desired object; (b) transmitting the set of images to the cloud server by the communication interface; (c) in response to found objects being obtained from the set of images based on at least one object detection algorithm in the cloud server, showing the found objects on the display device for a user to confirm which object is desired; and (d) in response to the desired object being confirmed from the found objects shown on the display device, loading the specific model of the desired object on the processor; wherein the specific model of the desired object is trained on the cloud server based on at least the set of images and related Convolutional Neural Network (CNN) algorithm.

According to an embodiment of the present invention, a method for detecting a specific object based on a specific model is provided. The method includes: capturing a set of images, wherein objects in each image include a desired object; transmitting the set of images to a cloud server; in response to found objects being obtained from the set of images based on at least one object detection algorithm in the cloud server, displaying the found objects for a user to confirm which object is desired; in response to the desired object being confirmed from the found objects that are displayed, loading the specific model of the desired object from the cloud server, wherein the specific model of the desired object is trained on the cloud server based on at least the set of images and related Convolutional Neural Network (CNN) algorithm; and performing the specific model to detect the specific object on a captured image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
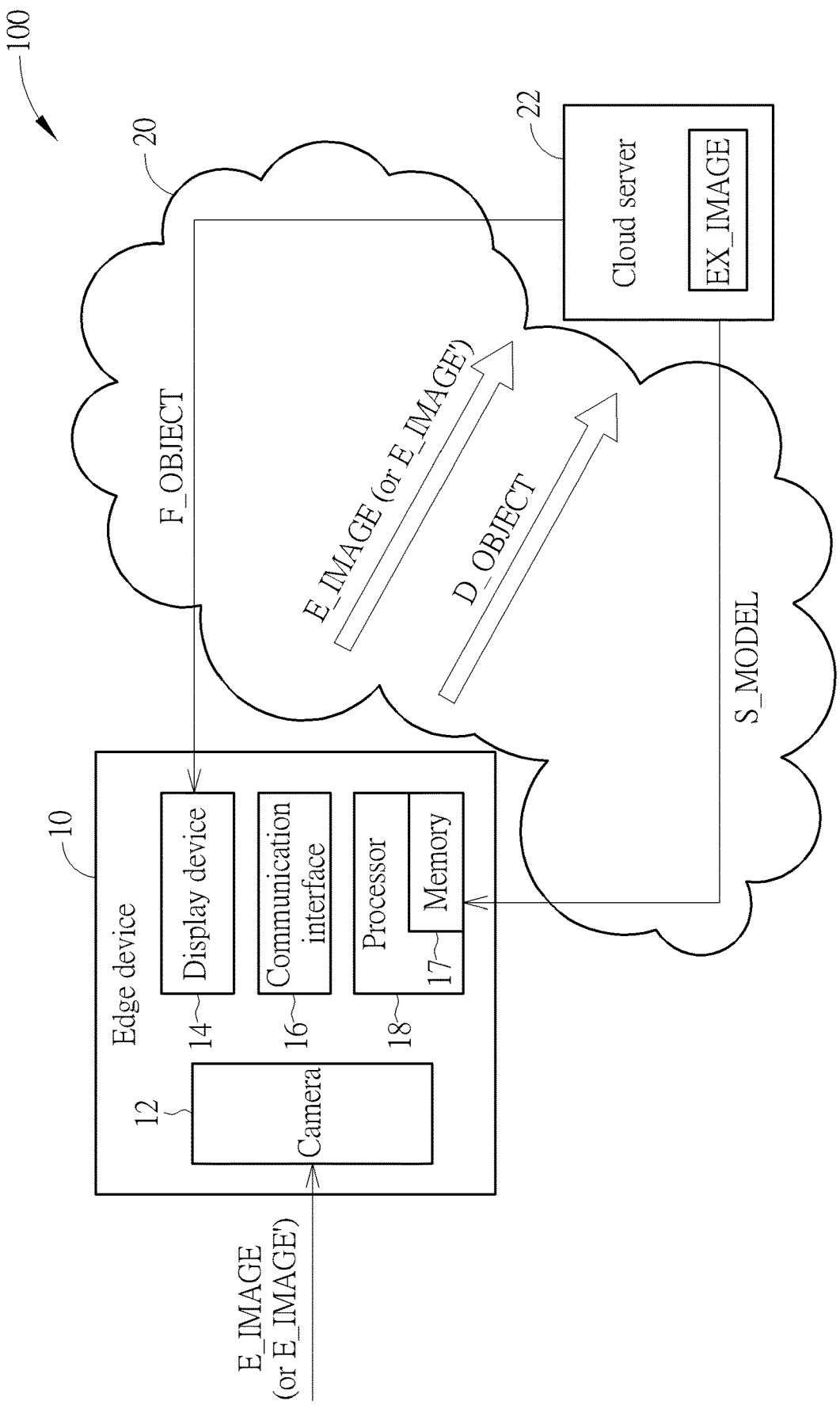
FIG. 1 is a diagram illustrating a cloud system according to an embodiment of the present invention.

FIG. 1 is a diagram illustrating a cloud system 100 according to an embodiment of the present invention. As shown in FIG. 1, the cloud system 100 includes an edge device 10 and a cloud server 22. The edge device 10 includes a camera 12, a display device 14 (e.g. a touch panel), a communication interface (e.g. a wired or wireless communication interface, such as universal serial bus (USB), USB Type-C, Wifi, or 4G/5G) 16, and a processor 18. The communication interface 16 is arranged to transmit data between the cloud server 22 and the edge device 10. The processor 18 is arranged to perform a specific model S_MODEL to detect a specific object on an image captured by the camera 12. In addition, the specific model S_MODEL may be stored in a memory 17. In this embodiment, the processor 18 is shown having an on-chip memory (e.g. status random access memory) that acts as the memory 17, but the present invention is not limited thereto. Alternatively, the memory 17 may be implemented using an off-chip memory (e.g. dynamic random access memory) of the processor 18. The cloud server 22 is coupled to the edge device 10 (more particularly, the communication interface 16) via a network (e.g. Internet) 20.

The edge device 10 may obtain the specific model S_MODEL by performing the following steps:
(a) capturing a set of images E_IMAGE by the camera 12, where objects in each image include a desired object D_OBJECT;
(b) transmitting the set of images E_IMAGE to the cloud server 22 by the communication interface 16;
(c) in response to found objects F_OBJECT being obtained from the set of images E_IMAGE based on at least one object detection algorithm in the cloud server 22, showing the found objects F_OBJECT on the display device 14 for a user to confirm which object is desired; and
(d) in response to the desired object D_OBJECT being confirmed from the found objects F_OBJECT shown on the display device 14, loading the specific model S_MODEL of the desired object D_OBJECT on the processor 18;
wherein the specific model S_MODEL of the desired object D_OBJECT is trained (e.g. fine-tuned) on the cloud server 22 based on at least the set of images E_IMAGE and related Convolutional Neural Network (CNN) algorithm.

It should be noted that, in step (c), if no object is obtained from the set of images E_IMAGE based on the at least one object detection algorithm in the cloud server 22, the edge device 10 performs step (a) again to update the set of captured images (i.e. capturing another set of images that are labeled as E_IMAGE' in FIG. 1), and then repeats following step(s) on the basis of the updated set of captured images. In step (d), if no desired object D_OBJECT is confirmed by the user from the found objects F_OBJECT shown on the display device 14, the edge device 10 also performs step (a) again to update the set of captured images (i.e. capturing another set of images that are labeled as E_IMAGE' in FIG. 1), and then repeats following step(s) on the basis of the updated set of captured images. In addition, during the process of training (e.g. fine-tuning) the specific model S_MODEL of the desired object D_OBJECT on the cloud server 22, the cloud server 22 first tries to find at least one set of extended images EX_IMAGE stored in the cloud server 22, wherein objects in each extended image include the desired object D_OBJECT. Then, the specific model S_MODEL of the desired object D_OBJECT is trained (e.g. fine-tuned) on the cloud server 22 based on the set of images E_IMAGE (or E_IMAGE') captured by the camera 12, the at least one set of extended images EX_IMAGE stored in the cloud server 22, and the related CNN algorithm.

For example, a user of the edge device 10 first capture 20 images (i.e. E_IMAGE) by the camera 12, wherein objects in each image include the desired object D_OBJECT. After the 20 images are transmitted from the edge device 10 to the cloud server 22 by the communication interface 16, the cloud server 22 tries to obtain the found objects F_OBJECT from the 20 images based on the at least one object detection algorithm in the cloud server 22. If no object is obtained from the 20 images based on the at least one object detection algorithm in the cloud server 22, the cloud server 22 asks the edge device 10 to capture another 20 images (i.e. E_IMAGE'). In response to the found objects F_OBJECT being obtained from the 20 images based on the at least one object detection algorithm in the cloud server 22, the found objects F_OBJECT is shown on the display device 14 for the user to confirm which object is desired, to determine the desired object D_OBJECT. If no desired object D_OBJECT is confirmed by the user from the found objects F_OBJECT shown on the display device 14, the edge device 10 is also asked to capture another 20 images (i.e. E_IMAGE') by the cloud server 22.

In response to the desired object D_OBJECT being confirmed from the found objects F_OBJECT that are shown on the display device 14, the cloud server 22 first tries to find 30 additional images (i.e. EX_IMAGE) that are stored in the cloud server 22, wherein objects in each additional image include the desired object D_OBJECT. The specific model S_MODEL of the desired object D_OBJECT is trained (e.g. fine-tuned) on the cloud server 22 based on the 20 images captured by the camera 12, the 30 additional images stored in the cloud server 22, and the related CNN algorithm. Then, the specific model S_MODEL is loaded on the processor 18, and the edge device 10 may perform the specific model S_MODEL to detect the specific object on a captured image generated by the camera 12.

In summary, by performing object detection/verification on the edge device 10 and training (e.g. fine-tuning) the specific model S_MODEL according to not only the set of images E_IMAGE (or E_IMAGE') captured by the camera 12 and the related CNN algorithm but the at least one set of extended images EX_IMAGE stored in the cloud server 22, the specific model S_MODEL that is loaded on the processor 18 may be able to detect the specific object on an image captured by the camera 12 with high accuracy rate and desired classification results. As a result, the edge device 10 of the present invention may reduce the probability of the over-fitting of model, and may improve the user experience greatly.

Figure 2:
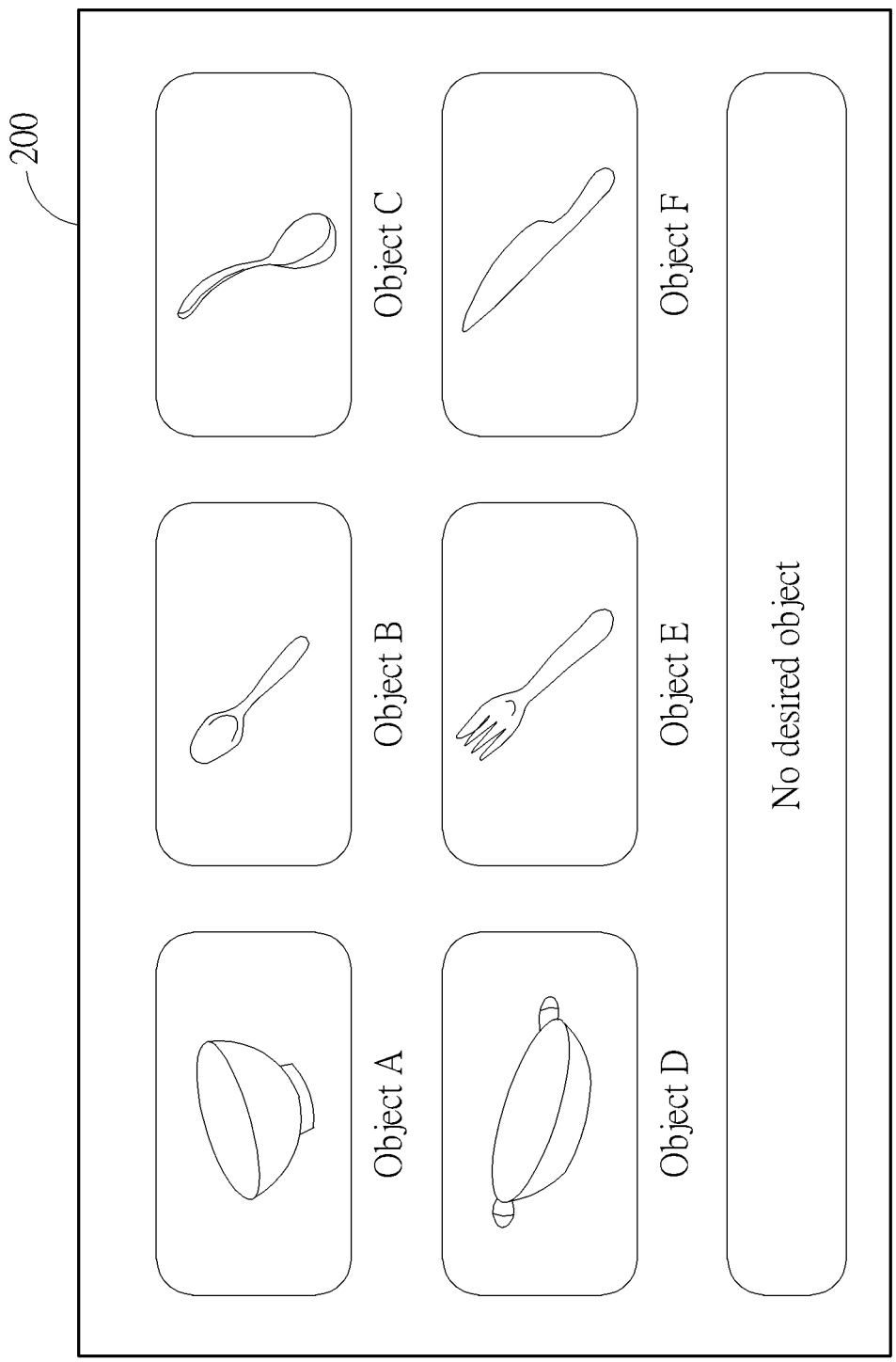
FIG. 2 is a diagram illustrating a touch panel according to an embodiment of the present invention.

FIG. 2 is a diagram illustrating a touch panel 200 according to an embodiment of the present invention. The display device 14 shown in FIG. 1 may be implemented by the touch panel 200 shown in FIG. 2. As shown in FIG. 2, 6 regions that represent 6 found objects (i.e. objects A, B, C, D, E, and F), respectively, are shown at the top of the touch panel 200 for the user to confirm which object is desired to determine the desired object, wherein the 6 found objects are obtained based on the at least one object detection algorithm in the cloud server, and the 6 found objects represent bowl, spoon, spoon with deep mouth, pot, fork, and knife, respectively. In addition, a region that represents the desired object is not in the 6 found objects is at the bottom of the touch panel 200 (labeled as "No desired object").

In FIG. 2, if the user chooses and touches one of the 6 regions at the top of the touch panel 200 (i.e. the users confirms one of the 6 found objects is the desired object), the chosen object is transmitted from the edge device to the cloud server for training (e.g. fine-tuning) the specific model of the desired object. For example, under the condition that the desired objects is a bowl, the user chooses and touches the object A. On the other hand, if the user touches the region labeled as "No desired object" (i.e. no desired object is confirmed by the user from the 6 found objects shown on the touch panel 200), the cloud server asks the edge device to capture another set of images. For example, under the condition that the desired object is a plate, the user touches the region labeled as "No desired object".

Figure 3:
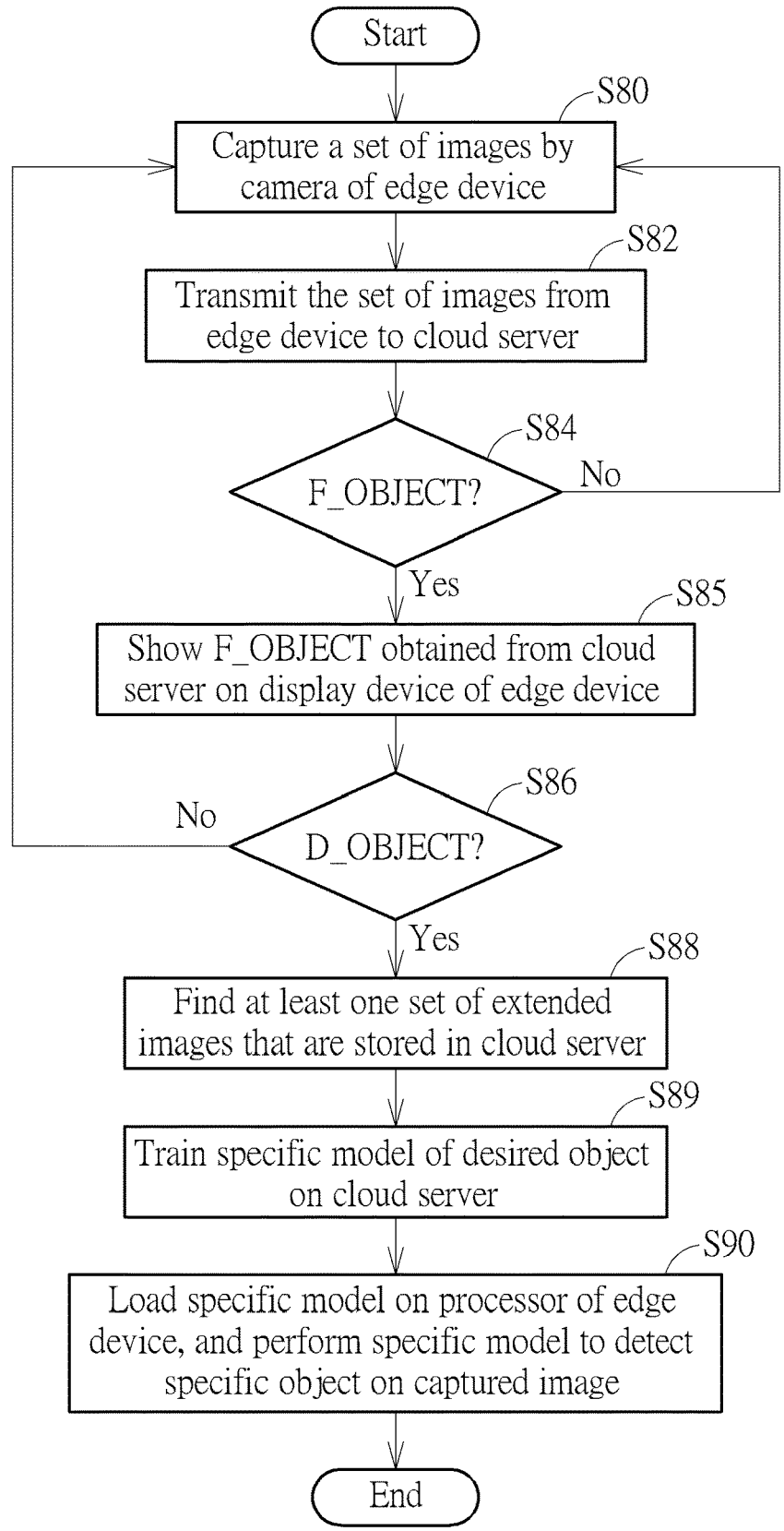
FIG. 3 is a flow chart of a method for detecting a specific object based on a specific model according to an embodiment of the present invention.

FIG. 3 is a flow chart of a method for detecting a specific object based on a specific model according to an embodiment of the present invention. Provided that the result is substantially the same, the steps are not required to be executed in the exact order shown in FIG. 3. For example, the method shown in FIG. 3 may be employed by the cloud system 100 shown in FIG. 1.

In Step S80, a set of images E_IMAGE is captured by the camera of the edge device, wherein objects in each image include a desired object.

In Step S82, the set of images E_IMAGE is transmitted from the edge device to the cloud server.

In Step S84, it is checked to determine if the cloud server obtains found objects F_OBJECT from the set of images E_IMAGE based on the at least one object detection algorithm. If the found objects F_OBJECT are obtained, Step S86 is entered; if no object is obtained, Step S80 is returned.

In Step S85, the found objects F_OBJECT obtained from the cloud server are shown on the display device of the edge device.

In Step S86, it is checked to determine if a user confirms the desired object D_OBJECT from the found objects F_OBJECT shown on the display device. If the desired object D_OBJECT is confirmed from the found objects F_OBJECT shown on the display device, Step S90 is entered; if the desired object D_OBJECT is not confirmed, Step S80 is returned.

In Step S88, the cloud server finds at least one set of extended images EX_IMAGE that are stored in the cloud server 22, wherein objects in each additional image include the desired object D_OBJECT. It is noted that Step S88 can be an optional step.

In Step S89, the specific model S_MODEL of the desired object D_OBJECT is trained (e.g. fine-tuned) on the cloud server based on the set of images E_IMAGE captured by the camera, the at least one set of extended images EX_IMAGE stored in the cloud server, and related CNN algorithm.

In Step S90, the specific model S_MODEL is loaded on the processor of the edge device. Then, the edge device may perform the specific model S_MODEL to detect the specific object on a captured image.

Since a person skilled in the pertinent art can readily understand details of the steps after reading above paragraphs directed to the cloud system 100, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An edge device for detecting a specific object based on a specific model, comprising:
a camera;
a display device;
a processor, arranged to perform the specific model to detect the specific object on an image captured by the camera; and
a communication interface, arranged to transmit data between a cloud server and the edge device;
wherein the edge device obtains the specific model by performing steps of:
(a) capturing a set of images by the camera, where objects in each image include a desired object;
(b) transmitting the set of images to the cloud server by the communication interface;
(c) in response to found objects being obtained from the set of images based on at least one object detection algorithm in the cloud server, showing the found objects on the display device for a user to confirm which object is desired;
(d) only in response to the desired object being confirmed from the found objects shown on the display device, training the specific model of the desired object on the cloud server; and
(e) after the specific model of the desired object is trained on the cloud server, loading the specific model of the desired object on the processor;
wherein the specific model of the desired object is trained on the cloud server based on at least the set of images and related Convolutional Neural Network (CNN) algorithm.

2. The edge device of claim 1, further comprising:
a memory, arranged to store the specific model.

3. The edge device of claim 1, further comprising:
in response to no object being obtained from the set of images based on the at least one object detection algorithm in the cloud server, performing step (a) again.

4. The edge device of claim 1, further comprising:
in response to no desired object being confirmed from the found objects shown on the display device, performing step (a) again.

5. The edge device of claim 1, wherein the specific model of the desired object is trained on the cloud server based on the set of images captured by the camera, at least one set of extended images stored in the cloud server, and the related CNN algorithm, wherein objects in each extended image include the desired object.

6. The edge device of claim 1, wherein the display device is a touch panel.

7. A method for detecting a specific object based on a specific model, comprising:
capturing a set of images, wherein objects in each image include a desired object;
transmitting the set of images to a cloud server;
in response to found objects being obtained from the set of images based on at least one object detection algorithm in the cloud server, displaying the found objects for a user to confirm which object is desired;
only in response to the desired object being confirmed from the found objects that are displayed, training the specific model of the desired object on the cloud server based on at least the set of images and related Convolutional Neural Network (CNN) algorithm;
after the specific model of the desired object is trained on the cloud server, loading the specific model of the desired object from the cloud server; and
performing the specific model to detect the specific object on a captured image.

8. The method of claim 7, wherein the specific model is performed by a processor to detect the specific object on the captured image, and the method further comprises:
storing the specific model in a memory.

9. The method of claim 7, further comprising:
in response to no object being obtained from the set of images based on the at least one object detection algorithm in the cloud server, performing the step of capturing the set of images again.

10. The method of claim 7, further comprising:
in response to the desired object not being confirmed from the found objects that are displayed, performing the step of capturing the set of images again.

11. The method of claim 7, wherein the specific model of the desired object is trained on the cloud server based on the set of images, at least one set of extended images stored in the cloud server, and the related CNN algorithm, where objects in each extended image include the desired object.

* * * * *